(No Model.) 2 Sheets—Sheet 2.
O. E. BALDRIDGE.
PLANTER.
No. 455,150. Patented June 30, 1891.
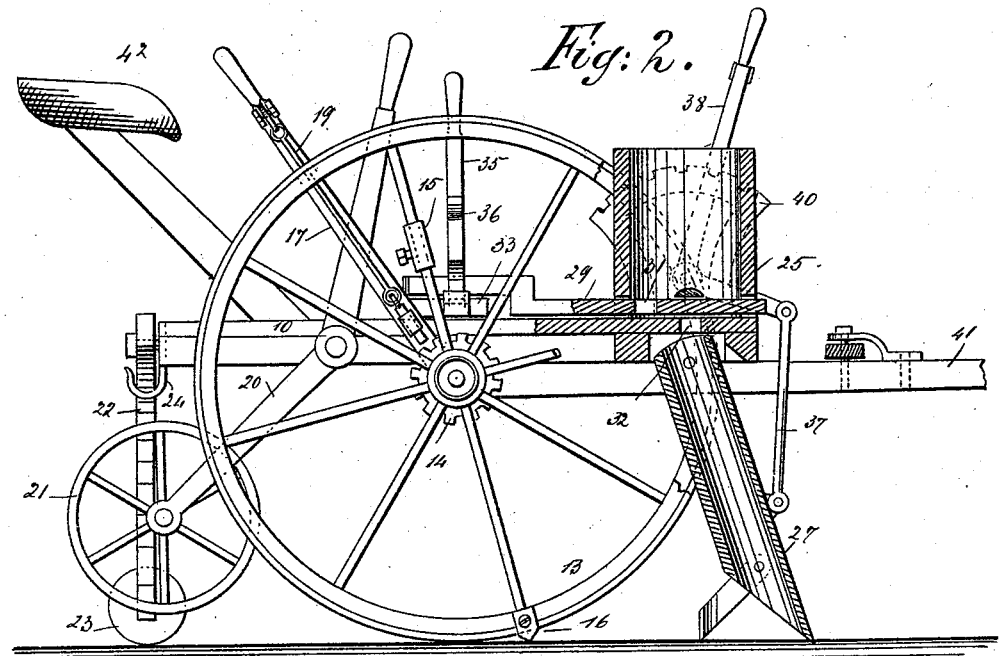
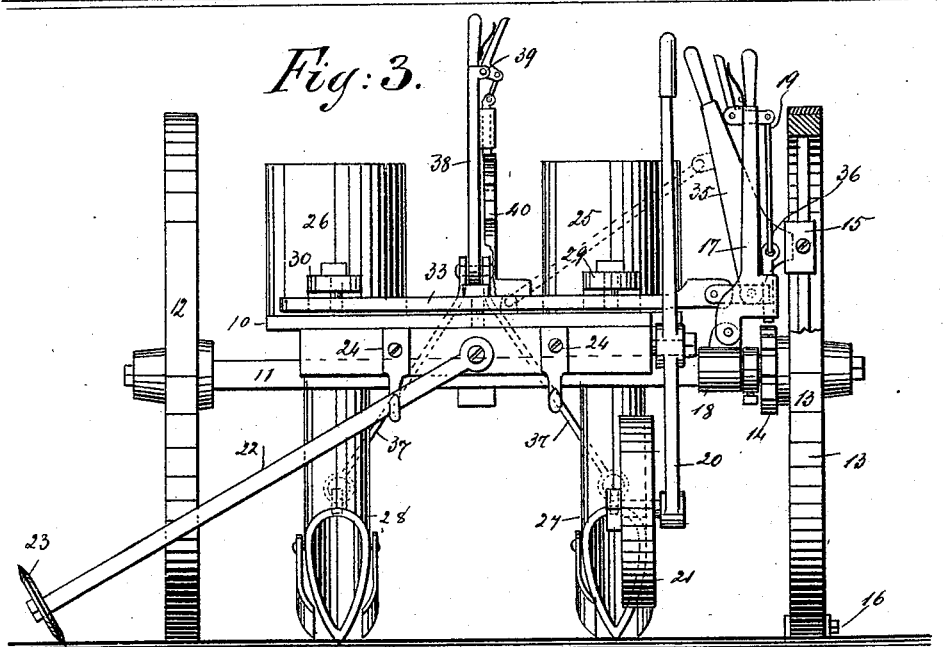

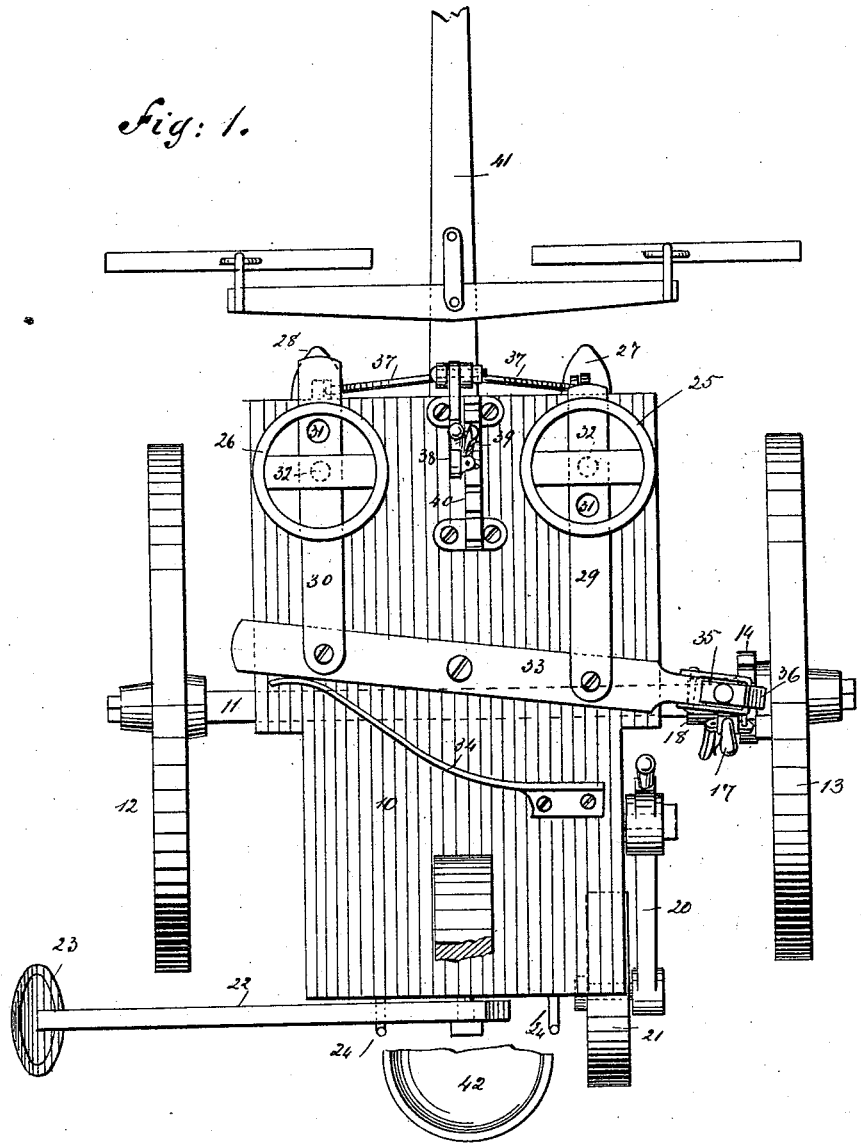

UNITED STATES PATENT OFFICE.

ORVAL ELVANES BALDRIDGE, OF ILLIOPOLIS, ILLINOIS.

PLANTER.

SPECIFICATION forming part of Letters Patent No. 455,150, dated June 30, 1891.

Application filed February 4, 1891. Serial No. 380,158. (No model.)

*To all whom it may concern:*

Be it known that I, ORVAL ELVANES BALDRIDGE, of Illiopolis, in the county of Sangamon and State of Illinois, have invented a new and useful Improvement in Planters, of which the following is a full, clear, and exact description.

My invention relates to an improvement in planters, and has for its object to simplify the construction of such apparatus and to materially reduce the cost of manufacture; and the invention consists in the novel construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the implement. Fig. 2 is a side elevation and partial vertical section, and Fig. 3 is a rear elevation of the implement.

The body 10 of the planter, which is essentially rectangular in shape, is mounted upon an axle 11, and upon the extremities of the axle wheels 12 and 13 are loosely mounted. The right-hand wheel 13 is adapted as a driving and marking wheel, and to that end the inner surface of the hub of the wheel is provided with an attached ratchet 14, and one or more of the spokes has adjustably secured thereon a sleeve 15, which acts as a cam or tappet for a purpose hereinafter described. Upon the periphery of the wheel check-row markers 16, of any approved construction, are secured, the said check-row markers corresponding in number and being arranged opposite the sleeves 15, as is best shown in Figs. 2 and 3.

The wheel 13 may be turned by the operator to properly register with the rows when starting thereon, which is accomplished by means of a lever 17, which lever is pivoted to a collar 18, the said collar being held to turn upon the axle, as is best shown in Fig. 3. The lever 17, which is a hand-lever, is provided with the usual latch 19, adapted to engage with the ratchet 14 of the wheel, but normally the latch is held out of engagement with the ratchet.

In order to set the wheel 13, it is necessary that it be lifted from the ground, and this is accomplished through the medium of an angled lever 20, which is centrally fulcrumed to one side of the body near the rear thereof, the said lever being provided at its lower end with a wheel 21.

When the planter is in operation, the wheel 21 is elevated from the ground, but when the drive-wheel 13 is to be set the upper end of the lever 20, which is within convenient reach of the driver, is drawn rearward until the wheel 21 strikes the ground, whereupon the wheel is utilized as a fulcrum whereby to raise the right-hand side of the planter.

At the central portion of the rear of the body 10 the upper end of a rod or bar 22 is pivoted, the said rod or bar having attached to its lower end a marker 23, preferably of disk form. The rod 22 is of sufficient length to extend beyond either of the wheels 12 and 13, and may be carried in the direction of either side of the planter, as occasion may demand or require; and hooks or brackets 24 are secured to the body, adapted to support and brace the marking-bar, as is clearly shown in Figs. 1 and 3.

At the front of the planter, upon the body 10, two transversely-aligning seed-boxes 25 and 26 are located, with the bottom of which seed-boxes two spouts or chutes 27 and 28 communicate, the said chutes being pivotally attached within an aperture of the body at their upper ends, as is best illustrated in Fig. 2.

Within the seed-boxes 25 and 26 seed dropbars 29 and 30 are held to slide, the said dropbars having movement longitudinally of the planter, and each drop-bar within its box is provided with an opening 31. The dropbars move in slots produced in opposite sides of the boxes and immediately above the floors of the boxes, in which floors, at about the center, openings 32 are made, the said openings being immediately above the upper ends of the chutes or spouts 27 and 28. The inner ends of the seed drop-bars are pivotally connected with a laterally-reciprocating lever 33, centrally pivoted upon the body 10 of the planter, the connection of the seed drop-bars being made one at each side of the fulcrum of the lever, as is best shown in Fig. 1; and against the rear edge of the left-hand end of the lever 33 the free end of a spring 34 has a bearing, the opposite end of which spring is firmly secured to the said body 10, as is likewise best shown in Fig. 1. The lever 33 is actuated through the medium of an arm 35, which is pivotally attached or hinged to the right-hand extremity of the lever; and the said arm is provided with an offset 36, adapted to be engaged by the sleeve or sleeves 15 upon the drive-wheel 13 when the planter is in operation, as illustrated in Fig. 3.

The chutes or spouts 27 and 28 are adapted to be lifted from the ground when the planter is carried to or from the field or when it is not used for planting, and this is effected through the medium of links 37, attached one to the forward face of each chute, the upper ends of said links being pivotally connected with the horizontal member of an angled lever 38, the said lever being fulcrumed in suitable bearings located between the seed-boxes, as shown in Fig. 1. The said lever 38 is provided with an ordinary thumb-latch 39, which engages with any approved form of rack 40. The tongue 41 is secured in any suitable manner to the forward portion of the planter.

In operation, when it is desired to plant, the arm 35 is carried to an essentially vertical position, as shown in Fig. 3, and as the wheel 13 revolves at each revolution of the wheel, when one sleeve 15 is employed said sleeve engages with the projection 36 of the arm and forces said arm forward, which carries with it the right-hand end of the lever 33, the left-hand lever being carried rearward against the tension of the spring 34, and the openings in the seed drop-bars 29 and 30 are so arranged that they will simultaneously register with the openings in the bottom of the seed-boxes the moment the right-hand extremity of the lever 33 is carried forward. As soon as the sleeve 15 disengages from the arm 35 the spring 34 acts to restore the lever 33 to its normal position.

When the planter is taken to or from the field, the arm 35 is carried inward and secured in any suitable manner—as, for instance, through the medium of a hook, as illustrated in dotted lines in Fig. 3, and when the arm is in this position it is carried out of engagement with the drive-wheel, and the planter may be carried backward or forward without operating the seed drop-bars.

The driver's seat 42 is preferably located at the rear of the planter, its support being attached ordinarily to the central portion of the body 10.

The seed may be covered by any of the well-known attachments, but preferably by curved blades secured to the rear lower portions of the chutes 27.

Having thus described my invention, I claim as new and desire to secure by Letters Patent—

1. In a planter, the combination, with a pivoted lever and seed-slides pivoted to the said lever on the opposite sides of its pivot, of an arm pivotally connected with one end of the lever and adapted to be operated by one of the wheels of the planter, substantially as and for the purpose set forth.

2. In a planter, the combination, with a pivoted lever, seed-slides pivoted to the lever on opposite sides of its pivots, and a spring engaging the lever, of an arm pivotally connected with one end of the arm, and a projection on one of the wheels, substantially as described.

3. In a planter of the character described, the combination, with the drive-wheel thereof provided with an adjustable sleeve upon one of its spokes, and seed-boxes, of a lever centrally fulcrumed, seed drop-bars pivoted to the lever, one at each side of the fulcrum of the lever and held to slide in the boxes, and an arm hinged at one end of the lever and provided with an offset adapted to engage with the sleeve of the drive-wheel, as and for the purpose set forth.

4. A planter comprising a supporting-frame, wheels upon which the frame is mounted, one of the said wheels being provided with a sleeve adjustably secured upon one of its spokes, seed-boxes, adjustable spouts pivoted beneath the seed-boxes, a lift-lever, link connections between the spouts and the lift-lever, a spring-pressed vibratory lever centrally fulcrumed, seed drop-bars pivoted to the lever, one at each side of the fulcrum of the lever and held to slide in the boxes, and an arm hinged to one end of the vibratory lever and adapted for engagement with the sleeve of the drive-wheel, as and for the purpose specified.

ORVAL ELVANES BALDRIDGE.

Witnesses:
WM. G. LEE,
JOHN WARD.